United States Patent [19]

Takimura et al.

[11] Patent Number: 4,513,635
[45] Date of Patent: Apr. 30, 1985

[54] DIFFERENTIAL GEAR FOR AUTOMOTIVE VEHICLES

[75] Inventors: Keisuke Takimura; Hideo Hamano, both of Toyota, Japan

[73] Assignee: Toyota Jidosha Kabushiki Kaisha, Toyota, Japan

[21] Appl. No.: 477,855

[22] Filed: Mar. 22, 1983

[30] Foreign Application Priority Data

Apr. 22, 1982 [JP] Japan .................. 57-60225[U]

[51] Int. Cl.³ .................. F16H 1/40; F16H 1/38; F16H 55/18; F16H 57/00
[52] U.S. Cl. .................. 74/713; 74/710; 74/409; 74/410
[58] Field of Search .................. 74/713, 710, 710.5, 74/711, 607, 409, 410; 384/125, 211, 212, 427

[56] References Cited

U.S. PATENT DOCUMENTS

| | | | |
|---|---|---|---|
| 2,808,740 | 10/1957 | Boden | 74/713 |
| 3,199,375 | 8/1965 | Rosen et al. | 74/713 |
| 3,452,620 | 7/1969 | Hughson | 74/713 |
| 3,872,741 | 3/1975 | Berchtold et al. | 74/711 X |
| 4,084,450 | 4/1978 | Conroy | 74/713 |
| 4,086,826 | 5/1978 | Von Kaler | 74/713 |
| 4,163,400 | 8/1979 | Fisher et al. | 74/710 |
| 4,305,313 | 12/1981 | Konkle | 74/713 X |

*Primary Examiner*—Allan D. Herrmann
*Assistant Examiner*—Stephen Andrews
*Attorney, Agent, or Firm*—Oblon, Fisher, Spivak, McClelland & Maier

[57] ABSTRACT

A differential gear for automotive vehicles comprising a washer interposed between the backs of pinions and the inner surface of a differential casing and fitted to a pinion shaft. The washer has at most a thickness of $1\tan\alpha$ wherein $1$ represents a displacement from an uncompressed condition of a spring washer to a compressed condition thereof exhibiting a predetermined pressure against the side gears. With this arrangement, the pinions may be installed into the differential casing without applying any pressure through the spring washers to the side gears, and after installation of the pinions into the differential casing, pressure between the meshed gear teeth of the side gears and the pinions may be desirably determined.

3 Claims, 1 Drawing Figure

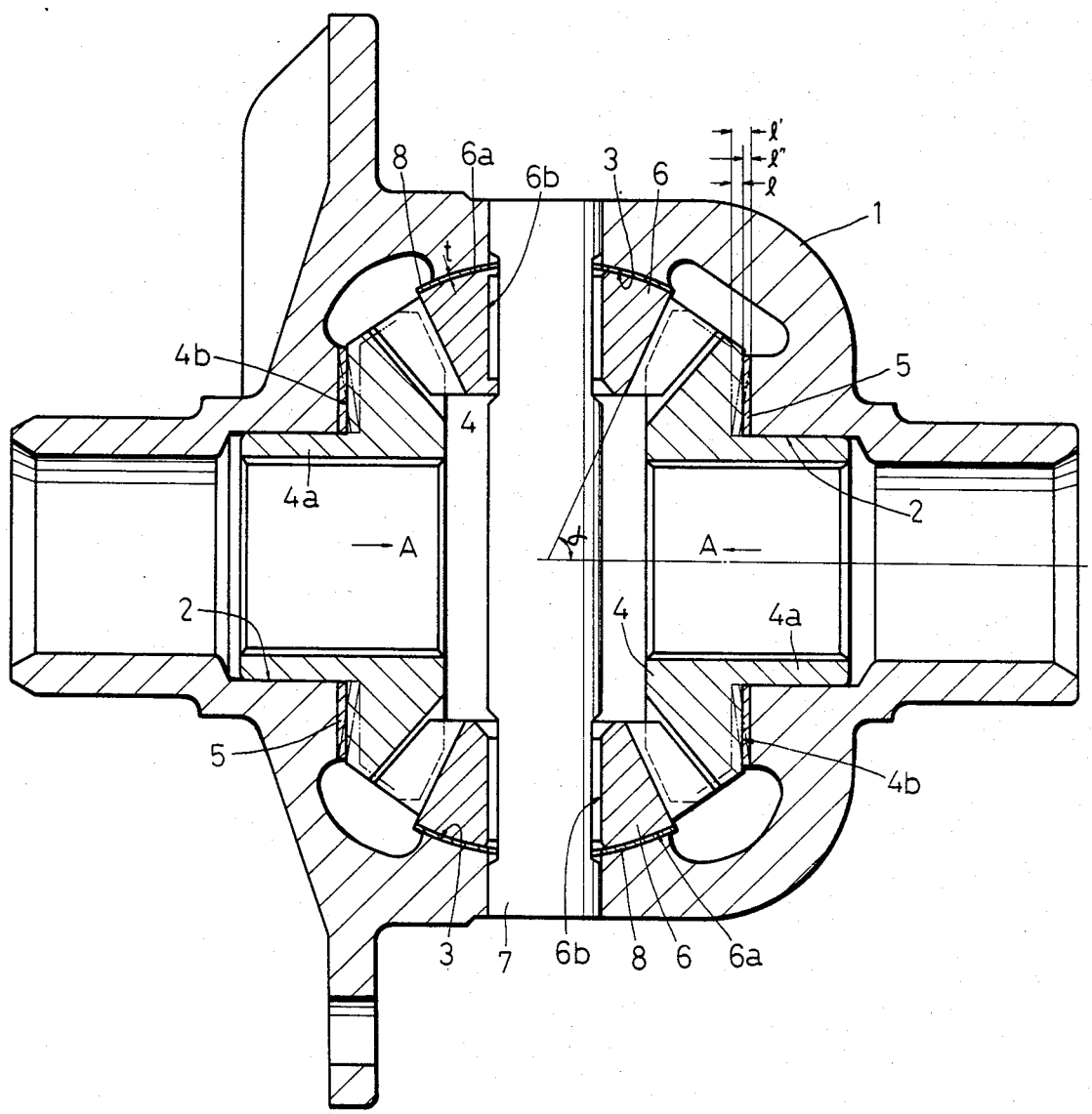

DIFFERENTIAL GEAR FOR AUTOMOTIVE VEHICLES

BACKGROUND OF THE INVENTION

This invention relates to a differential gear for automotive vehicles wherein pressure between the meshed gear teeth of the side gears and the pinions installed into the differential casing is determined by the spring washers interposed between the backs of the side gears and the inner surface of the differential casing.

In this kind of differential gear, a pair of side gears and a pair of pinions are installed into the differential casing in such a way that, first of all, both of the side gears are installed into the differential casing and then, both of the pinions are installed into the differential casing in meshed engagement with the side gears. Upon installation of the pinions into the differential casing, it is disadvantageous that both of the side gears should be urged to the inner surface of the differential casing against the resilient force of the spring washers and the pinions are positioned, being accompanied by their rotation. Therefore, it is necessary to use a special tool for meshing the pinions with the side gears urged to the inner surface of the differential casing upon assembling and repair of a differential gear.

SUMMARY OF THE INVENTION

Accordingly, an object of the present invention is to provide a differential gear for automotive vehicles wherein the pinions may be readily installed into the differential casing without applying any pressure to the side gears.

Another object of the present invention is to provide a differential gear for automotive vehicles wherein pressure between the meshed gear teeth of the side gears and the pinions may be desirably determined after installation of the pinions into the differential casing.

According to the present invention, a differential gear for automotive vehicles includes a differential casing, a pair of side gears oppositely situated in and rotatably supported by the differential casing, said side gears having a pitch cone angle $\alpha$, a pinion shaft arranged at right angle to the axis of the side gears and fixed to the differential casing at both ends thereof, a plurality of pinions rotatably mounted on the pinion shaft and adapted to mesh with the side gears and a spring washer interposed between the back of each side gear and the inner surface of the differential casing, whereby the gear teeth of the side gears and the pinions are meshed with each other at a predetermined pressure by the resilient force of the spring washer. The improvement in the above-mentioned differential gear comprises a ring-like washer interposed between the back of each pinion and the inner surface of the differential casing and fitted to the pinion shaft. The washer has at most a thickness of $l \tan \alpha$ wherein $l$ represents a displacement from an uncompressed condition of the spring washer to a compressed condition thereof exhibiting a predetermined pressure against the side gears. With this arrangement, before the washer is interposed between the back of each pinion and the inner surface of the differential casing, the pinions may be installed into the differential casing without applying any pressure through the spring washers to the side gears or under an uncompressed condition of the spring washers. Therefore, assembling and repair of the differential gear may be easily carried out without requirement of any special tool.

Other objects and advantages of the invention will become apparent from the following description and accompanying drawing.

BRIEF DESCRIPTION OF THE DRAWING

The drawing shows a vertical sectional view of the differential casing of an embodiment according to the invention.

DETAILED DESCRIPTION OF THE PREFERRED EMBODIMENT

Referring now to the drawing, reference numeral 1 designates a differential casing of an integral type into which a pair of side gears and a pair of pinions designed to mesh with the side gears are installed through openings (not shown). Both of the side gears 4 are rotatably supported by the differential casing 1 in such a manner that a sleeve portion 4a of each side gear 4 is inserted into each cylindrical portion 2 of the differential casing 1. Both of the pinions 6 are rotatably supported by a pinion shaft 7 both ends of which are fixed on the differential casing 1.

There are provided spring washers 5 between the back 4b of each side gear 4 and the inner surface of the differential casing 1 which surface is opposed to the back 4b of each side gear 4, so as to apply a biasing force through the spring washers 5 to the side gears 4 in the direction depicted by arrows A in the drawing. There are also provided another ring-like washers 8 between the back 6a of each pinion 6 and the curved inner surface 3 of the differential casing 1 which surface is opposed to the back 6a of each pinion 6. The washers 8 have a predetermined thickness and are preferably made of metal and are fitted on the pinion shaft 7. Pressure between the meshed gear teeth of the side gears 4 and the pinions 6 is determined by the thickness of the washers 8 and the resilient force of the spring washers 5.

It should be noted that the thickness t of the washers 8 is given by the following equation.

$$t \leq l \tan \alpha \tag{1}$$

wherein $\alpha$ is a pitch cone angle of each side gear 4 and $l$ is given by the following equation.

$$l = l' - l'' \tag{2}$$

wherein $l'$ is a dimension between the back 4b of each side gear 4 and the inner surface of the differential casing 1 before installation of the side gears and the pinions, and $l''$ is a dimension between the back 4b of each side gear 4 and the inner surface of the differential casing 1 after installation of the side gears and the pinions. Namely, $l$ in the equation (2) is a displacement from the preinstallation state to the postinstallation state of the side gears 4. Under the postinstallation state, the spring washers 5 are compressed so as to exhibit a predetermined pressure against the side gears 4.

Installation of the side gears 4 and pinions 6 into the differential casing 1 will be carried out as follows: First, the side gears 4 are installed into the differential casing 1 with the spring washers 5 interposed between the back 4b of each side gear 4 and the inner surface of the differential casing 1. Second, the pinions 6 are moved to a predetermined position in meshed engagement with the side gears 4.

In the above-described operation, since there is provided a clearance having a dimension t between the back 6a of each pinion 6 and the curved inner surface 3 of the differential casing 1, the pinions 6 may be readily installed into the differential casing 1 even when the spring washers 5 are under the uncompressed condition and the side gears 4 are in the position shown by the phantom line in the drawing. In other words, the pinions 6 may be meshed with the side gears 4 in the differential casing 1 without applying to them pressure against the resilient force of the spring washers 5 or without applying pressure between the meshed gear teeth of the pinions 6 and the side gears 4. After the pinions 6 are set to a predetermined position, the side gears 4 are urged in the direction reverse to that depicted by the arrow A in the drawing against the resilient force of the spring washers 5, and then the washers 8 having a thickness t given by the equation (1) are interposed between the back 6a of each pinion 6 and the curved inner surface 3 of the differential casing 1. Owing to the provision of the washers 8, the side gears 4 are urged by the distance of $l \geqq t \cot \alpha$ in the direction reversed to that depicted by the arrow A against the resilient force of the spring washers 5, thus determining the pressure between the meshed gear teeth of the side gears 4 and the pinions 6. Thereafter, the pinion shaft 7 is inserted into the central aperture 6b of the pinions 6 from the outside of the differential casing 1, thus completing the installation of the side gears 4 and the pinions 6 into the differential casing 1.

While the invention has been described with reference to a preferred embodiment thereof, it is to be understood that modifications or variations may be easily made without departing from the scope of this invention which is defined by the appended claims.

What is claimed is:

1. In a differential gear for automotive vehicles including a differential casing, a pair of side gears oppositely situated in and rotatably supported by the differential casing, said side gears having a pitch cone angle $\alpha$, a pinion shaft arranged at right angle to the axis of the side gears and fixed to the differential casing at both ends thereof, a plurality of pinions rotatably mounted on the pinion shaft and adapted to mesh with the side gears and a spring washer interposed between the back of each side gear and the inner surface of the differential casing, whereby the gear teeth of the side gears and the pinions are adapted to mesh with each other at a predetermined pressure by the resilient force of the spring washer; the improvement comprising a washer interposed between the backs of said pinions and the inner surface of said differential casing and fitted to said pinion shaft, said washer having at most a thickness of l tan $\alpha$ wherein l represents a displacement from an uncompressed condition of said spring washer to a compressed condition thereof exhibiting a predetermined pressure against said side gears.

2. The improvement as defined in claim 1, wherein said washer has a ring-like structure.

3. The improvement as defined in claim 1, wherein said washer is made of metal.

* * * * *